(12) United States Patent
Gioia

(10) Patent No.: US 12,270,205 B2
(45) Date of Patent: Apr. 8, 2025

(54) ENHANCED SPACKLE APPLICATION DEVICE

(71) Applicant: Robert Gioia, Babylon, NY (US)

(72) Inventor: Robert Gioia, Babylon, NY (US)

( * ) Notice: Subject to any disclaimer, the term of this patent is extended or adjusted under 35 U.S.C. 154(b) by 218 days.

(21) Appl. No.: 17/983,512

(22) Filed: Nov. 9, 2022

(65) Prior Publication Data

US 2024/0151042 A1 May 9, 2024

(51) Int. Cl.
*E04F 13/04* (2006.01)
*C09J 7/38* (2018.01)
*E04F 21/165* (2006.01)

(52) U.S. Cl.
CPC .............. *E04F 13/042* (2013.01); *C09J 7/38* (2018.01); *E04F 21/1655* (2013.01); *E04F 21/1657* (2013.01); *C09J 2203/37* (2020.08)

(58) Field of Classification Search
CPC ... E04F 19/022; E04F 19/028; E04F 13/0887; E04F 13/0896; E04F 13/042; E04F 21/1657; C09J 7/38; C09J 2203/37
See application file for complete search history.

(56) References Cited

U.S. PATENT DOCUMENTS

| 2,314,523 | A | * | 3/1943 | Speer | ........... | E04F 13/04 |
| | | | | | | 428/126 |
| 5,246,775 | A | * | 9/1993 | Loscuito | ........... | C09J 7/21 |
| | | | | | | 428/41.5 |
| 6,226,946 | B1 | | 5/2001 | Stough | | |
| 8,828,892 | B2 | | 9/2014 | Dong | | |
| 9,476,206 | B2 | | 10/2016 | Miller | | |
| 10,280,338 | B2 | * | 5/2019 | Mayo | ........... | C09J 7/21 |
| 10,640,986 | B2 | * | 5/2020 | Rosenthal | ........... | B32B 37/14 |
| D932,061 | S | | 9/2021 | Freely | | |
| 2013/0189500 | A1 | * | 7/2013 | Adams | ........... | C09J 7/21 |
| | | | | | | 28/100 |
| 2017/0138058 | A1 | | 5/2017 | Swartz | | |
| 2019/0085573 | A1 | | 3/2019 | Dia | | |

FOREIGN PATENT DOCUMENTS

GB 580999 A * 9/1946
WO WO2017083387 5/2017

* cited by examiner

*Primary Examiner* — Adriana Figueroa

(57) ABSTRACT

An enhanced spackle application device for facilitating an application of spackle to drywall includes a taping member having a top surface, a bottom surface, and a perimeter edge. The bottom surface is semi-adhesive and removably fastens upon a joint of a drywall. The joint is between adjacently positioned and abutting drywall panels. The perimeter edge is crenulated and facilitates blending spackle applied on the top surface of the taping member onto the drywall. The perimeter edge includes a pair of lateral edges, a first edge, and an end edge. A crease line is spaced between the lateral edges and is elongated from the first end to the end edge. The taping member is wound about a circular center member to define a roll of tape.

6 Claims, 6 Drawing Sheets

ENHANCED SPACKLE APPLICATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to tapes and more particularly pertains to a new tape for facilitating an application of spackle to drywall.

(2) Description of Related Art Including Information Disclosed Under 37 CFR 1.97 and 1.98

The prior art relates to tapes and includes a variety of tapes being used to assist in applying spackle to a drywall. The prior art does not include a tape having a crenulated perimeter edge to facilitate blending of spackle upon the drywall.

BRIEF SUMMARY OF THE INVENTION

An embodiment of the disclosure meets the needs presented above by generally comprising a taping member having a top surface, a bottom surface, and a perimeter edge. The bottom surface is semi-adhesive and removably fastens upon a joint of a drywall. The joint is between adjacently positioned and abutting drywall panels. The perimeter edge is crenulated and is configured for facilitating blending spackle applied on the top surface of the taping member onto the drywall. The perimeter edge includes a pair of lateral edges, a first edge, and an end edge. A crease line is spaced between the lateral edges and is elongated from the first end to the end edge. The taping member is wound about a circular center member to define a roll of tape.

Another embodiment of the disclosure comprises a method including the steps of unwinding a taping member from a roll of tape and severing a segment of the tape member from the roll. A bottom surface of the segment removably fastens upon a joint of a drywall and spackle is applied upon a top surface of the segment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
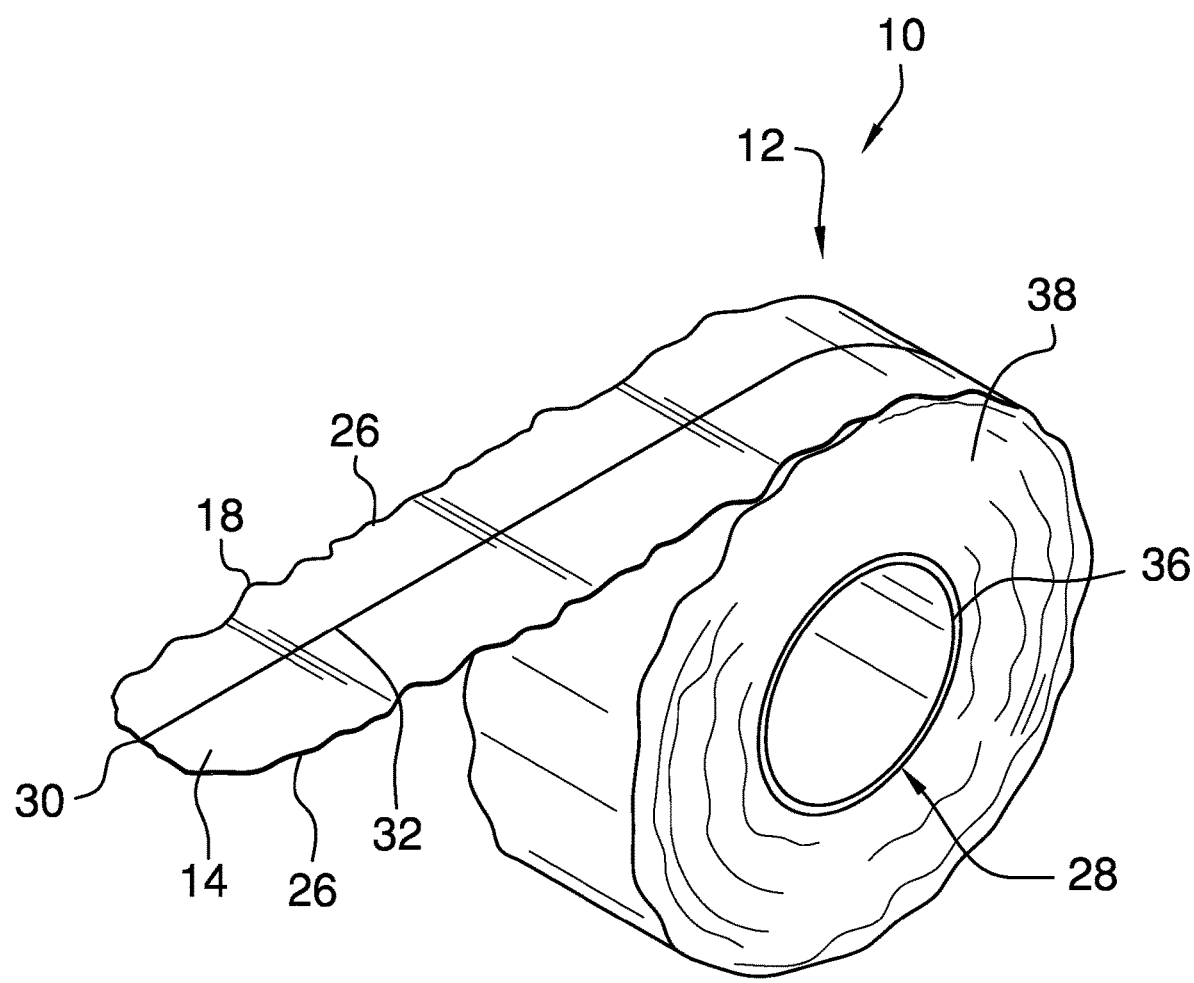
FIG. 1 is a front isometric view of an enhanced spackle application device according to an embodiment of the disclosure.
Figure 2:
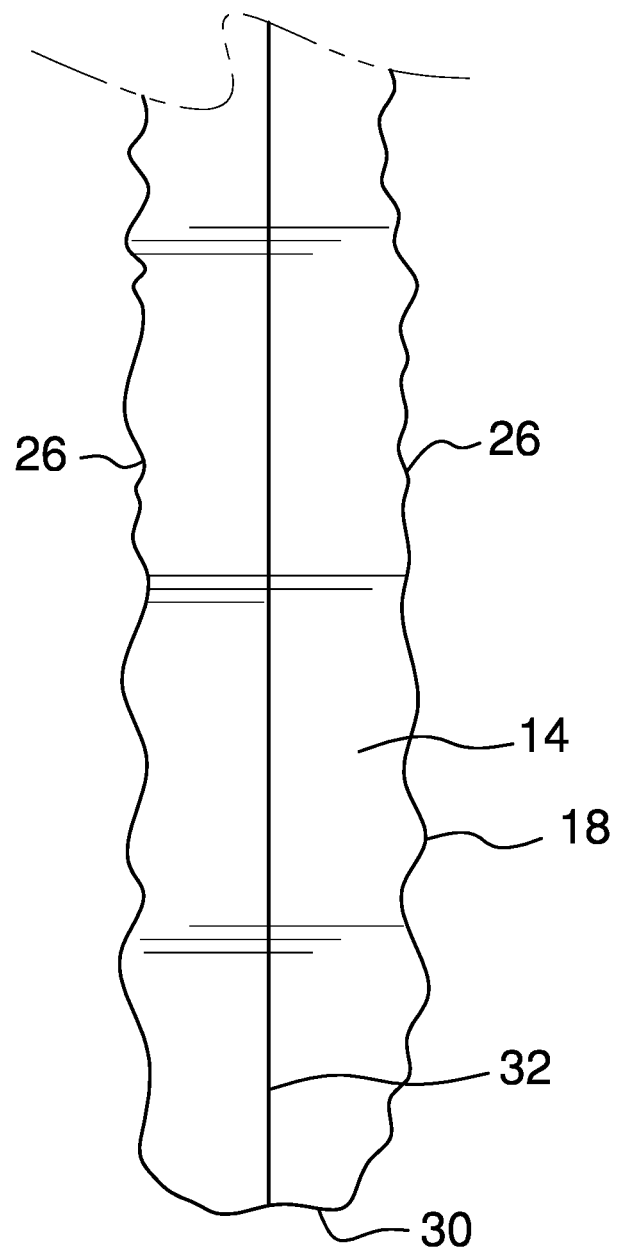
FIG. 2 is a front view of an embodiment of the disclosure.
Figure 3:
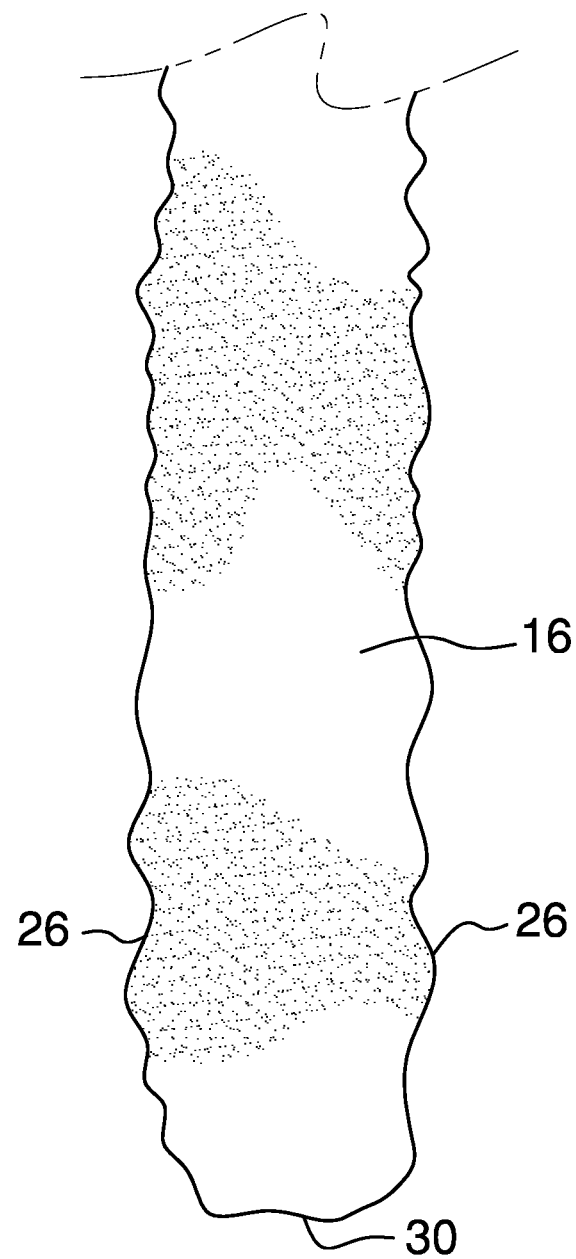
FIG. 3 is a bottom view of an embodiment of the disclosure.
Figure 4:
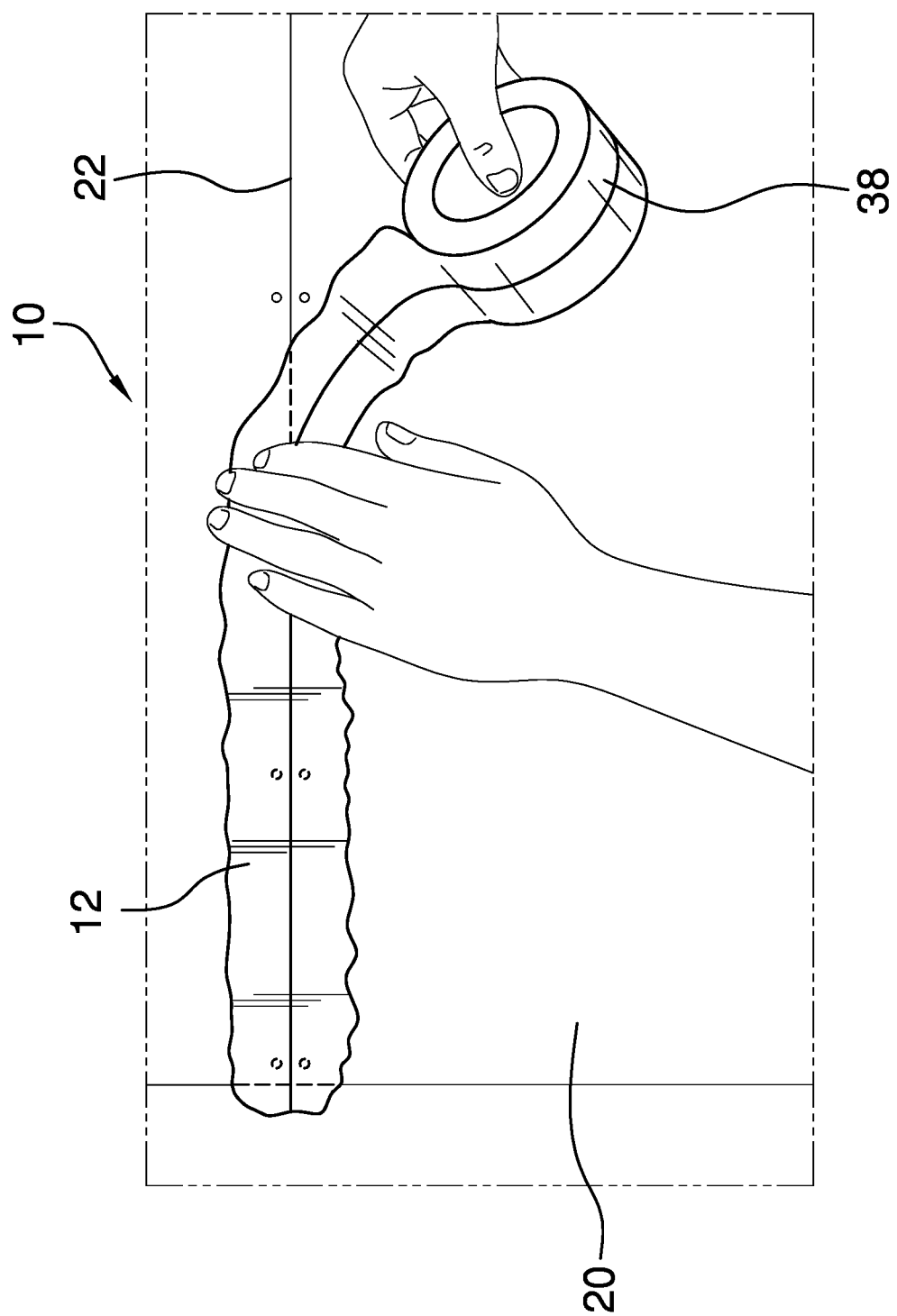
FIG. 4 is an in-use view of an embodiment of the disclosure.
Figure 5:
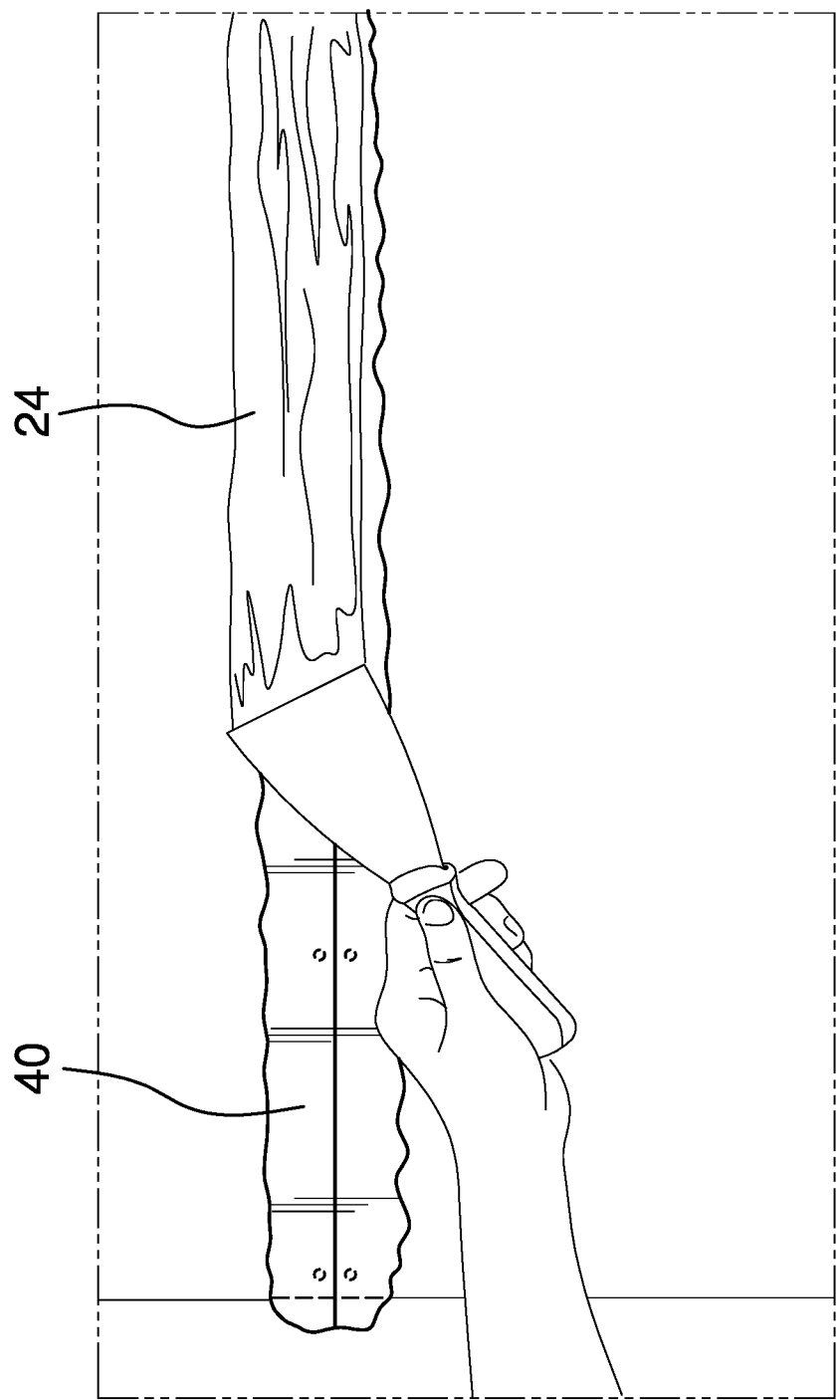
FIG. 5 is an in-use view of an embodiment of the disclosure.

With reference now to the drawings, and in particular to FIGS. 1 through 6 thereof, a new tape embodying the principles and concepts of an embodiment of the disclosure and generally designated by the reference numeral 10 will be described.

As best illustrated in FIGS. 1 through 6, the enhanced spackle application device generally comprises a taping member 12 having a top surface 14, a bottom surface 16, and a perimeter edge 18. The bottom surface 16 is typically semi-adhesive and removably fastens upon a joint 22 of a drywall 20. The joint 22 is between adjacently positioned and abutting drywall panels.

Figure 6:
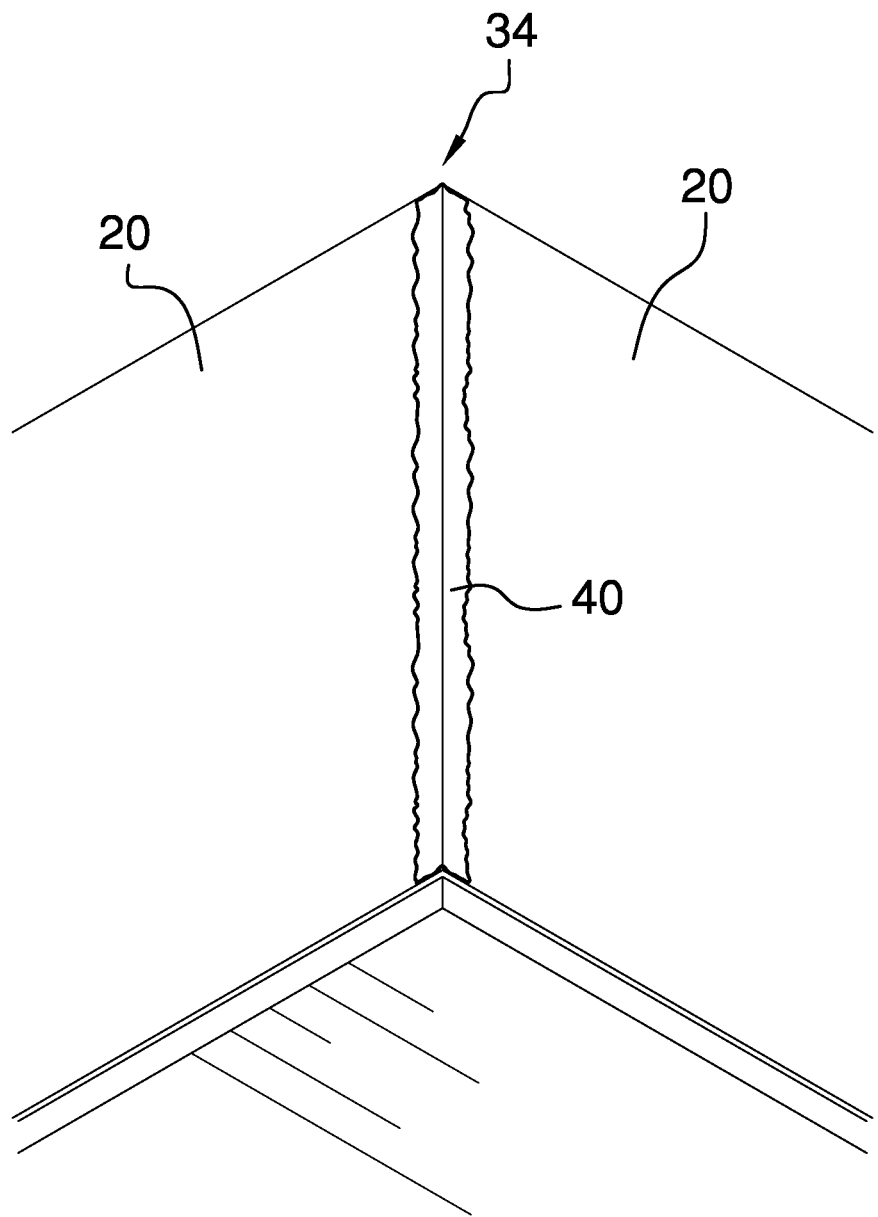
FIG. 6 is an in-use view of an embodiment of the disclosure.

The perimeter edge 18 is crenulated and is configured for facilitating blending spackle 24 applied on the top surface 14 of the taping member 14 onto the drywall 20. The perimeter edge 18 includes a pair of lateral edges 26, a first edge 28, and an end edge 30. Each of the lateral edges 26 has a distance between each other and the distance is varied along the taping member 12 from the first edge 28 to the end edge 30 to define an irregular pattern of the perimeter edge 18. A crease line 32 is spaced between the lateral edges 26 and is elongated from the first end 28 to the end edge 30. The crease line 32 facilitates bending the taping member 12 and is configured to facilitate fastening the taping member 12 to a corner joint 34 between a pair of drywalls, as shown in FIG. 6.

The taping member 12 is wound about a circular center member 36 to define a roll of tape 38. The first edge 28 is positioned within a center of the roll of tape 38 and the end edge 30 is removably positioned on an exterior of the roll of tape 38. The taping member 12 is typically flexible wherein the tape member 12 is configured to be unwound from the roll of tape 38. The taping member 12 is tearable wherein the taping member 12 is configured for severing a segment 40 of the taping member 12 from the roll of tape 38.

In use, the taping member 12 unwinds from the roll of tape 38 and the segment 40 of the tape member 12 severs from the roll of tape 38. The bottom surface 16 of the segment 40 removably fastens upon the joint 22 of the drywall 20 and spackle is applyed upon a top surface 14 of the segment 40. The irregular pattern of the perimeter edge 18 of the segment 40 facilitates blending spackle onto the drywall 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An enhanced compound application device comprising:
    a taping member having a top surface, a bottom surface, and a perimeter edge, said bottom surface being semi-adhesive and removably fastening upon a joint of a drywall, said joint being between adjacently positioned and abutting drywall panels, said perimeter edge being crenulated in an irregular arrangement of crenulations along the perimeter edge and being configured for facilitating blending spackle applied on said top surface of said taping member onto said drywall, said perimeter edge including a pair of lateral edges, a first edge, and an end edge;
    a crease line being spaced between said lateral edges and being elongated from said first end to said end edge; and
    a circular center member, said taping member being wound about said circular center member to define a roll of tape.

2. The enhanced compound application device of claim 1, wherein each of said lateral edges has a distance between each other, said distance being varied along said taping member from said first edge to said end edge and defining the irregular arrangement of crenulations along the perimeter edge.

3. The enhanced compound application device of claim 2, wherein said crease line facilitating bending said taping member to facilitate fastening said taping member to a corner joint.

4. The enhanced compound application device of claim 3, wherein said first edge is positioned within a center of said roll of tape and said end edge is removably positioned on an exterior of said roll of tape.

5. The enhanced compound application device of claim 4, wherein said taping member is flexible wherein the taping member is configured to be unwound from said roll of tape, said taping member being tearable wherein the taping member is configured for severing a segment of the tape member from the roll.

6. An enhanced compound application device comprising:
    a taping member having a top surface, a bottom surface, and a perimeter edge, said bottom surface being semi-adhesive and removably fastening upon a joint of a drywall, said joint being between adjacently positioned and abutting drywall panels, said perimeter edge being crenulated in an irregular arrangement of crenulations along the perimeter edge and being configured for facilitating blending spackle applied on said top surface of said taping member onto said drywall, said perimeter edge including a pair of lateral edges, a first edge, and an end edge, each of said lateral edges having a distance between each other, said distance being varied along said taping member from said first edge to said end edge and defining the irregular arrangement of crenulations along the perimeter edge;
    a crease line being spaced between said lateral edges and being elongated from said first end to said end edge, said crease line facilitating bending said taping member to facilitate fastening said taping member to a corner joint; and
    a circular center member, said taping member being wound about said circular center member to define a roll of tape, said first edge being positioned within a center of said roll of tape and said end edge being removably positioned on an exterior of said roll of tape, said taping member being flexible wherein the taping member is configured to be unwound from said roll of tape, said taping member being tearable wherein the taping member is configured for severing a segment of the tape member from the roll.

\* \* \* \* \*